US011775044B1

(12) United States Patent
Bakken et al.

(10) Patent No.: US 11,775,044 B1
(45) Date of Patent: Oct. 3, 2023

(54) ENERGY RECYCLING IN AN EMBEDDED SYSTEM

(71) Applicant: ONiO AS, Oslo (NO)

(72) Inventors: Vemund Bakken, Oslo (NO); Ronan Barzic, Oslo (NO); Marco Silva Pereira, Oslo (NO); Somayeh Hossein Zadeh, Oslo (NO)

(73) Assignee: ONIO AS, Oslo (NO)

( * ) Notice: Subject to any disclaimer, the term of this patent is extended or adjusted under 35 U.S.C. 154(b) by 0 days.

(21) Appl. No.: 17/711,061

(22) Filed: Apr. 1, 2022

(51) Int. Cl.
G06F 1/3206 (2019.01)
H02M 3/155 (2006.01)

(52) U.S. Cl.
CPC ........... G06F 1/3206 (2013.01); H02M 3/155 (2013.01)

(58) Field of Classification Search
CPC .............................. G06F 1/3206; H02M 3/155
See application file for complete search history.

(56) References Cited

U.S. PATENT DOCUMENTS

| 2008/0077817 | A1 | 3/2008 | Brundridge et al. |
| 2011/0127832 | A1 | 6/2011 | Kundur Subramaniyan et al. |
| 2011/0260643 | A1* | 10/2011 | Huang ............... G05F 1/46 315/294 |
| 2013/0138978 | A1* | 5/2013 | Barowski ............ G06F 1/3287 307/115 |
| 2013/0264870 | A1 | 10/2013 | Keysar et al. |
| 2015/0077170 | A1* | 3/2015 | Bose ................. H02J 1/14 327/427 |
| 2016/0197508 | A1 | 7/2016 | Kruiskamp |
| 2018/0212519 | A1* | 7/2018 | Kapoor ............. H02M 3/158 |
| 2018/0287407 | A1 | 10/2018 | Sayre |
| 2020/0073453 | A1 | 3/2020 | Kapoor et al. |
| 2020/0350817 | A1* | 11/2020 | De .................. H02M 3/155 |
| 2021/0141436 | A1 | 5/2021 | Grant et al. |
| 2021/0175798 | A1* | 6/2021 | Liang ............... H03F 1/0205 |
| 2022/0021304 | A1* | 1/2022 | Liu ................. H03F 1/0205 |

FOREIGN PATENT DOCUMENTS

WO  WO 2021/262185 A1  12/2021

OTHER PUBLICATIONS

Combined Search and Examination Report under Sections 17 and 18(3) in related Application No. GB2118354.6. dated Jun. 6, 2022.

(Continued)

Primary Examiner — Gary Collins
(74) Attorney, Agent, or Firm — Hershkovitz & Associates, PLLC; Abe Hershkovitz

(57) ABSTRACT

Described herein is an embedded system comprising: at least one power domain comprising analogue and/or digital circuitry; at least one domain storage unit (166) for providing energy to the power domain; a main storage unit (172) for storing energy for provision to the at least one domain storage unit; power switches for controlling the flow of energy between the storage units of the circuit; and a power management unit operable to control the power switches to transfer energy from the at least one domain storage unit back to the main storage unit or to an additional domain storage unit of the system. Also described is a method for operating an embedded system.

21 Claims, 4 Drawing Sheets

(56) References Cited

OTHER PUBLICATIONS

Search Report under Section 17 in corresponding Application No. GB2204768.2, dated Oct. 28, 2022.
Written Opinion in corresponding Application No. GB2204768.2, dated Oct. 28, 2022.
Norwegian Search Report in corresponding Application No. 20220400, dated Oct. 10, 2022.
Office Action in corresponding Application No. 20220400, dated Oct. 10, 2022.
International Search Report in corresponding International Application No. PCT/NO2023/050072, dated Jul. 4, 2023.
Written Opinion in corresponding International Application No. PCT/NO2023/050072, dated Jul. 4, 2023.

* cited by examiner

ENERGY RECYCLING IN AN EMBEDDED SYSTEM

The present invention relates to an energy efficient embedded system, and in particular to an energy efficient embedded system operable to re-allocate energy from internal storage. The present invention also relates to a method for energy recycling which is applicable to an embedded system including a microcontroller.

The advent of the MOS transistor in the mid-1900s allowed for the development of embedded systems including microcontrollers or MCUs (microcontroller units), which over the subsequent half century became rapidly more and more powerful, and more and more compact. An embedded system generally includes a microcontroller or MCU (microcontroller unit), itself a small computer comprising at least one processor such as a microprocessor or CPU, which is associated with some memory in the form of RAM and/or embedded flash memory. Additional hardware in the form of peripherals (on-chip or external) may also be included. More recent incarnations of these embedded systems also often include components such as timers, serial ports, hardware for providing radio communication capabilities, UART peripherals for communication with external devices, USB ports for communication and power supply to the chip, and/or DC/DC converters.

Microcontrollers used in embedded systems require energy to run, and this energy has traditionally been sourced from a battery or a mains power source coupled to the SOC. Power usage is a critical issue for this type of device, and a great deal of effort has been applied in the industry to adapting both software and hardware in order to try to minimize this. Power saving adaptations can rely on the chip being configured to run in a number of different modes, so that peripherals are powered off when they are not required. This is sometimes not the ideal solution, since powering on the peripherals again after switch-off can often require additional power for configuration. The use of a standby mode is also common, where power to the CPU is cut-off, but power to the RAM is maintained.

Microcontrollers generally require a lower voltage input than is provided by regular lithium-ion batteries, and so it is necessary to include a converter in order to step-down the voltage for supply to the MCU. This can be an expensive addition to an embedded system, and other solutions are desirable. Batteries also deplete during storage due to low-level chemical reactions continuing, and this reduces the shelf-life of any system including a battery. Companies have begun to consider the use of alternative energy sources, and to this end have started to design SOCs which are able to interface with renewable energy sources such as RF energy sources, ambient temperature energy sources, PV cells, and the like.

Where two sources are used in tandem, the source capable of supplying the highest voltage is generally selected at any one time, and a determination of which of the sources fulfills this requirement is carried out periodically, such as every few seconds. U.S. Pat. No. 7,053,691, for example, describes a circuit which allows for selection of one of a number of power sources. The selection is based on availability or non-availability of the various sources.

Energy drawn from the source used to power the circuit, whether this be from a renewable source interfaced with the circuit, from the mains, or from a battery, can optionally be passed through a rectifier (in the case of an AC source) and then an inductor which in turn feeds energy to the energy consuming components of the circuit, which themselves are usually linked to one of a number of power domains. In previous embedded systems having the capability of interfacing with one or more renewable energy sources, the inductor is charged and/or discharged based on a traditional clocked approach. The inductor is energized for a certain length of time and then will transfer energy, possibly to a capacitor, which can be utilized to perform the various tasks to be run in that clock cycle. The time period for energizing the inductor, and the time period for transfer of energy from the inductor, will depend on the clock frequency of the associated oscillator and will therefore be fixed.

A traditional power management unit (PMU) will control provision of the required voltages to the one or more power domains of the system using the clocked inductor.

The inductor will be used for transfer of energy from the power source to the main storage unit of the circuit. Energy on the main storage unit is then usually fed to domain storage units for provision to a power domain of the chip associated with that domain storage unit. The requirements of each power domain are very specific, and for this reason the supplied voltage needs to be carefully controlled. In particular, the voltage supplied should be below a threshold level in order to prevent damage to the electronics of the circuit and above a threshold voltage level in order to allow the consuming electronics to operate effectively.

The powered electronic domains will also have variable load/current requirements making it still more difficult to continuously supply a voltage in the required range. To help to ensure that this is achieved, energy from the main storage unit of the device can be transferred to the power domains via decoupling capacitors. However, when a power domain is switched on, a significant amount of energy is required to fill up these capacitors to a workable level. Once energy is no longer required by the power domain, the excess energy on the capacitor is usually passed through a "bleed out circuit" and is simply wasted. In a system comprising multiple power domains, with each switching on and off depending on which tasks are required to be completed at what time, the energy wasted through the bleed-out resistors can represent significant losses.

Energy saving and efficiency in embedded systems configured to interface with one or more alternative sources of energy still requires a great deal of improvement. Although different modes of operation and the selection of one of a number of power sources to supply an SOC do go some way to reducing the power requirements of such systems, the energy usage is still a limiting factor in terms of the utility of devices including such systems. Improvements in efficiency are thus always desirable.

According to a first aspect of the present invention, there is provided an embedded system comprising: at least one power domain comprising analogue and/or digital circuitry; at least one domain storage unit for providing energy to the power domain; a main storage unit for storing energy for provision to the at least one domain storage unit; one or more power switches for controlling the flow of energy between the storage units of the circuit; and a power management unit operable to control the one or more power switches to transfer energy from the at least one domain storage unit back to the main storage unit or to an additional domain storage unit of the system. The one or more power switches may be a plurality of power switches, and controlling the power switches can comprise switching (from off to on, or from on to off) one, some, or all of the power switches to transfer of energy between units of the system. The main storage unit may be configured to store energy from a power source.

The present invention provides a system in which there is no necessity for bleed out circuits associated with the domain storage units, and the energy remaining on the units once the domain returns to an idle state is not simply lost. Instead, the power management unit (PMU), which may be an integrated PMU, is operable to control recovery of this excess energy back to the main storage unit where it can be utilized to serve additional power domains, or to control transfer directly to the additional power domains where it is required. The system described herein therefore operates extremely efficiently compared to previous systems of the same type. The principle of energy recovery from the domain storage units can be used in any embedded system having a main energy storage unit and one or more domain storage units for supply of energy to an associated power domain, and/or that has more than one domain storage unit between which energy can be transferred. The main energy storage unit may be a rechargeable or non-rechargeable battery, or a component supplied with energy using another external source, and the domain storage unit(s) can be any unit capable of storing energy for a time so that it can be utilized by the electronics (the analogue and/or digital circuitry) of an associated power domain as needed in order to run tasks. This type of system could be operable in a mobile phone, for example, or in a sensor, or another device including a microchip and requiring energy to run. If an additional domain storage unit is present (i.e. if the system includes more than one domain storage unit), then this additional domain storage unit may serve a different power domain than the at least one domain storage unit from which energy is transferred, and the additional power domain may comprise its own analogue and/or digital circuitry.

Recovery of energy from the domain storage unit is under control of the PMU, which receives and responds to requests for energy from the different power domains of the chip. The PMU can be integrated as part of a system on chip, and is operable to control transfer of energy not only from the main storage unit for supply to the power domains, but in the opposite direction to recycle energy which would otherwise be wasted back to the main storage unit or directly to another power domain of the system. This capability is based on a higher level of control and feedback than has previously been utilised, and allows for energy transfer between the different domain storage units, the main storage unit, and a charge/discharge control storage unit (if present) in both directions rather than just one way. This allows the PMU to conduct energy transfer operations between units to ensure that all of the energy received or collected by the chip is utilized to run operations. This type of waste reduction is crucial when the chip is to be used with renewable power sources, which may be unstable and may provide low levels of energy during certain time periods. Maximising energy usage is also particularly important where continuous operation is vital, such as when the system is to be used in a medical monitoring device. Energy sensors can be associated with each of the domain storage units to provide information to the PMU regarding the energy available at each unit if desired.

As well as controlling power switches to transfer energy from the main storage unit to the domain storage units or (if a separate power source is included) from a power source to the main storage unit, the PMU, or specifically charge/discharge control logic of the PMU, is operable to configure the power switches to transfer energy from one or more of the domain storage units back to the main storage unit or to an additional domain storage unit of the system for supplying energy to a different power domain. This can be referred to as a recycling mode, or as a recycling cadence, as explained in more detail below.

In embodiments, the embedded system comprises an energy sensor for monitoring a level of energy on the at least one domain storage unit, wherein the power management unit is configured to control the power switches to transfer energy from the domain storage unit only when the level of energy is above a threshold. Initiating the transfer of energy will comprise controlling power switches of the system to transfer energy from the domain storage unit to the main storage unit or to the additional domain storage unit. A domain storage unit will continue to send periodic requests for energy until all tasks requiring energy and associated with that power domain have been completed, at which point it will stop sending requests. In a traditional system, the energy remaining on the domain storage units will at this point be bled out of the system, usually by running a current from the domain storage unit through a resistor. In the system described here, the energy can in some cases remain on the capacitor for a short time rather than immediately initiating a recycling cadence. If the domain again requires energy for a task within that time, the request signals will again begin to be sent and energy will begin to be provided again to the electronics of the power domain. If not, then the PMU will initiate the transfer of energy from the domain storage unit back to the main storage unit or to an additional domain storage unit of the system using the power switches. Waiting a certain length of time to begin energy recovery avoids transfer of energy to the main storage unit which will shortly need to be transferred again to the domain storage unit, making the system still more efficient.

In embodiments, the threshold level of energy is 0 Joules. If any energy is stored on the domain storage unit once the power domain switches off or becomes idle, this will therefore be re-allocated. The power management unit may also be configured to continue the transfer of energy from the at least one domain storage unit to the main storage unit or an additional domain storage unit only when the level of energy is above the threshold. If the threshold is 0 Joules, the energy recovery process may thus continue until the energy on the domain storage unit reaches 0 Joules (the domain storage unit is fully depleted). The threshold energy level in some cases, or for some of the domain storage units, may be higher, between 1 and 10 Joules, for example, in which case energy will not be transferred away from the domain storage unit to the main or another domain storage unit if the level of energy falls below this threshold. This allows the domain storage units to retain a small amount of energy. This higher threshold may be used only for domain storage units with more critical functions, with complete depletion of other domain storage units during energy recycling being allowed.

There are several situations which can trigger the PMU to initiate the transfer of energy away from the at least one domain storage unit to one or more other storage units of the system. These are hierarchical in terms of their importance, but if any occur (and there is some energy or above a threshold level of energy on the domain storage unit) the transfer will be initiated.

In embodiments, the power management unit is configured to control the one or more power switches to transfer energy from the at least one domain storage unit in response to a request for energy by one or more additional power domains having higher priority. The domain storage units may be subject to a hierarchy which is under the control of the PMU, and which is dependent on the particular tasks executed by applications associated with each power domain. Some tasks will be more critical, in which case the domain storage unit associated with the power domain executing those tasks will be ranked more highly. If a highly ranked power domain requests energy then the PMU will supply energy to that domain, even at the expense of another power domain of lower ranking which is requesting energy. Energy may be transferred directly from the power domain storage unit of lower priority to the power domain storage unit of higher priority, or may be transferred between the two via the main storage unit. This will occur even if the domain storage unit of lower priority is sending a "keep alive" signal indicating that energy is required, and even if the application of the associated power domain has not indicated that it no longer requires energy to complete one or more tasks being run.

In embodiments, the power management unit is configured to control the power switches to transfer energy from the at least one domain storage unit in response to an indication from an application of the power domain that energy is no longer required. The application itself can override a request for energy sent to the PMU.

The application may, for example, be required to execute a task once every minute or once every second. The task may take only several milliseconds to complete, which will mean that the domain is idle for relatively long periods. The application can in such a case inform the PMU that the task is complete, in response to which the PMU will initiate transfer of energy from the domain storage unit associated with the application to the main storage unit or to another domain storage unit where it can be reapplied to complete a task and will not be wasted. This may occur even if the domain storage unit associated with the power domain is sending its "keep alive" signal.

In embodiments, the domain storage unit is configured to repeatedly send a signal to the power management unit to indicate that the power domain needs to stay powered, and the power management unit is configured to control the one or more power switches to transfer energy from the at least one domain storage unit when the signal is not received for an amount of time. This corresponds to the "keep alive" signal referred to above. The signals can be sent periodically or aperiodically (intermittently and with a varying period). In embodiments, the amount of time is configurable. The amount of time may be between 1 and 50, preferably between 1 and 20 periods of the signal or between 1 ms and 100 ms, preferably between 1 ms and 50 ms, and more preferably between 1 ms and 20 ms, for example. The signal may be consistent or may vary between repetitions.

The PMU thus receives requests from the power domains if a task needs to be run immediately or if it is anticipated that energy will be required shortly, and the PMU continues to supply energy to the domain, via the domain storage unit, while the request signal is sent. If many such requests are received at once, then the PMU may prioritize which power domains to supply in which order. The PMU will, however, try to service the different requests for energy as quickly as possible. The repeated signal is a straightforward way for the domain to inform the PMU of requirements. The signal can include additional information in some cases regarding one or more of the voltage required, the urgency of the task to be completed, and the type of task to be completed, although this is not necessarily the case.

By utilizing keep alive signals sent by the domain storage units or the applications of the power domains, much of the processing is "outsourced" to the separate domains, rather than energy requirements being determined solely be the PMU. The separate domains are able to inform the PMU when spare energy is available, and the PMU is able to respond to this information by redistributing energy between the domain storage units in an efficient way. The PMU can also apply its own hierarchy in terms of where energy should be sent, or which are the most important functions of the system.

In embodiments, the embedded system comprises a plurality of power domains, wherein each power domain is associated with and served by a dedicated domain storage unit, and wherein the power management unit is operable to control power switches of the system to transfer energy from any of the plurality of dedicated domain storage units back to the main storage unit or to another of the plurality of domain storage units. Energy recovery from any of the domain storage units of the system is therefore possible.

In embodiments, the embedded system comprises an inductor, wherein controlling the one or more power switches of the system to transfer energy from the domain storage unit comprises controlling the power switches to accumulate energy from the at least one domain storage unit on the inductor and then to transfer the accumulated energy from the inductor to the main storage unit or the additional domain storage unit. Although an inductor represents a preferred way to transfer energy from the domain storage unit, this could be achieved in different ways. If capacitors are used as the domain storage units, these could be coupled in parallel to another capacitor, for example, resulting in a redistribution of the voltages on the two units to equalize them. This will represent a transfer of energy from the domain storage unit if the energy level thereon is higher that on the linked capacitor. A number of capacitors arranged in series and parallel with switches to adapt the configuration could therefore in principle be used to transfer energy in the desired direction.

In embodiments, the power management unit is also configured to control the one or more power switches to accumulate energy from the main storage unit on the inductor and then to transfer the accumulated energy from the inductor to the at least one domain storage unit. The same inductor of the system is therefore used to transfer energy in both directions, and the direction in which this is transferred depends on which of the power switches are open and which closed at what times during the energy transfer process. Transfer of energy via the inductor comprises connecting the inductor up to the unit from which energy is to be transferred in order to allow energy to accumulate on the inductor, and then controlling the power switches to allow this accumulated energy to flow onwards to the receiving unit.

In embodiments, the embedded system comprises a peak current sensor circuit for monitoring a current through the inductor as the energy is accumulated thereon, wherein the power management unit is configured to control the one or more power switches to connect the inductor for transfer of the accumulated energy away from the inductor in response to a signal from the peak current sensor circuit that peak current has been reached. Transfer may be to the main storage unit or to the additional domain storage unit from the at least one domain storage unit, or may be to the domain storage unit if the inductor is being used to transfer energy from the main storage unit. In this case the inductor is not clocked as in a traditional circuit, and the energy transfer process is adaptable to account for the speed at which energy can be accumulated on the inductor.

In embodiments, the embedded system comprises a plurality of power domains, wherein each power domain is associated with and served by a dedicated domain storage unit, and wherein the power management unit is operable to control the one or more power switches to accumulate energy from any of the plurality of domain storage units on the inductor and then transfer the accumulated energy from the inductor to the main storage unit or to another of the plurality of domain storage units. Transfer of energy from any one of the domain storage units to the main storage unit or to another of the domain storage units is again via the same inductor. This same inductor can also be used to charge the main storage unit from an external power source if present. The system configured in this way, with flow of energy in both directions through the same inductor, is both simple and energy efficient. Alternatively, different inductors associated with each domain storage unit can be used for the energy transfer process to and from each unit.

In embodiments, the power management unit comprises charge/discharge control logic for controlling accumulation of energy on the inductor and transfer of energy from the inductor to the main storage unit, the additional domain storage unit, and/or the at least one domain storage unit, and the charge/discharge control logic is served by a dedicated charge/discharge control logic storage unit.

In embodiments, the at least one domain storage unit is a capacitor. The domain storage unit may have a capacitance of between 1 µF and 50 µF, preferably between 5 µF and 15 µF, preferably around 10 µF. The main storage unit may also be a capacitor, with a capacitance between 10 µF and 500 µF, preferably between 50 µF and 200 µF, preferably around 100 µF. In general, the capacitance of the main storage unit may be between 2 and 20 times the capacitance of each of the one or more domain storage units, preferably between 5 and 15 times, and most preferably around 10 times the capacitance of each the one or more domain storage units.

In embodiments, the power management unit is configured to control the power switches to continue the transfer of energy from the domain storage unit until the domain storage unit is fully depleted.

In embodiments, the system comprises a comparator coupled to the domain storage unit configured to send an indication to the PMU when the energy on the domain storage unit is at or below a threshold. This threshold may be 0 Joules.

In embodiments, the embedded system is a monolithic system on chip comprising a plurality of blocks including: the power management unit and a core logic unit comprising the analogue and digital circuitry, and having a memory. In embodiments, the blocks comprise a multimode RF domain having one or more radio transceivers and a peripheral domain for interfacing with peripherals. Such a system can be used in a lightweight sensing patch for sending medical data, or for monitoring the status of a device whose continuous operation is important, for example. In this type of system energy saving via recovery of energy from the domain storage is particularly beneficial.

In embodiments, the main storage unit is configured to store energy from at least one power source. In embodiments, the power management unit is configured to interface with the at least one power source to control transfer of energy therefrom to the main storage unit. In embodiments, the at least one power source is a renewable power source. Clearly, where renewable power sources are concerned, any energy saving capability is particularly crucial. Energy savings can be made in order to avoid any interruption in function at times when power from the sources may be less readily available (at night in the case of a PV source, for example).

According to a second aspect of the present invention, there is provided a device comprising the embedded system of the first aspect and the at least one power source. The device may also comprise an environment sensor coupled to the system, for monitoring a property of the surroundings.

According to a third aspect of the present invention, there is provided a method for operating an embedded system comprising: at least one power domain comprising analogue and/or digital circuitry; at least one domain storage unit for providing energy to the power domain; a main storage unit for storing energy for provision to the at least one domain storage unit; and at least one power switch for controlling the flow of energy between the storage units of the system, wherein the method comprises: controlling, by a power management unit of the system, the at least one power switch to transfer energy from the at least one domain storage unit back to the main storage unit or to an additional domain storage unit of the system. Two or more power switches may be present.

Embodiments of the present invention will now be described, by way of example only, with reference to the following diagrams wherein.

Figure 1:
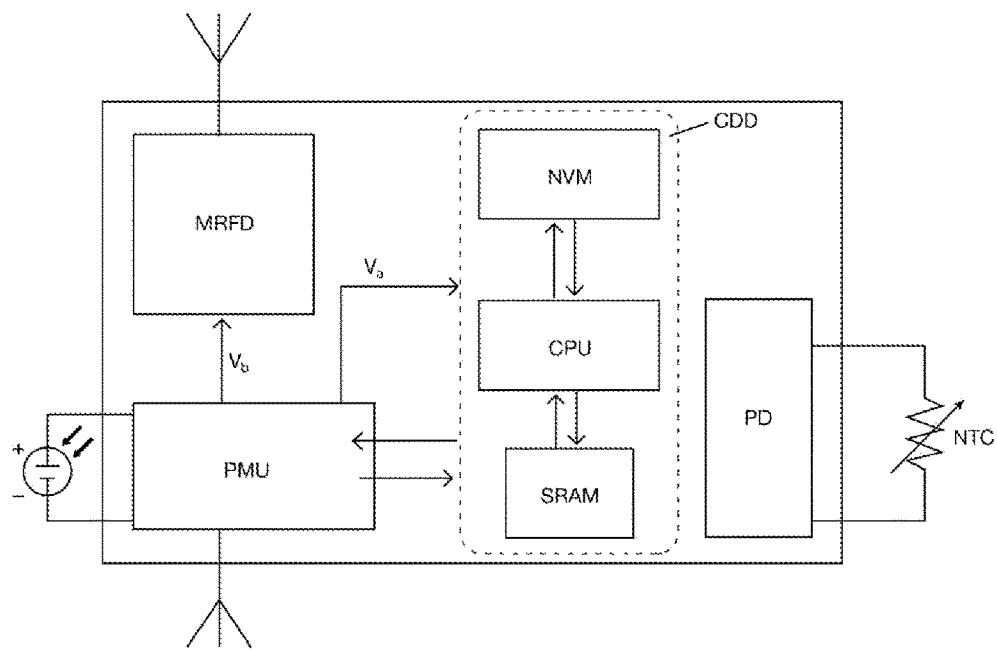
FIG. 1 illustrates an SOC including multiple blocks.

The components of an embedded system in one possible configuration are shown in FIG. 1. The embedded system in this case is a system on chip comprising at least four separate blocks including a core logic unit or core digital domain (CDD), a multimode RF domain (MRFD), a peripheral domain (PD), and a power management unit (PMU). The inclusion of the PMU as part of the SOC, and the way in which it interacts with other parts of the system to control energy input and recovery results in an extremely compact system and an efficient energy usage across a wide range of energy levels, as will be described in detail below.

The core digital domain or core logic unit comprises a CPU, static RAM (SRAM), and non-volatile memory (NVM). The MRFD includes at least one radio frequency transmitter or transceiver for sending and receiving data from external or internal devices. This transceiver/transmitter can implement multiple radio protocols such as BTLE and IEEE 802.15.4. The PD comprises circuitry for interfacing with external devices, which may include an environment sensor such as one or more of a temperature sensor, heart rate sensor, EEG/ECG sensor, blood pressure measuring devices, or any other biometric sensing device. The chip may also include one or more internal sensors which may be comprised as part of an additional block or as part of one of the existing blocks, such as the core digital domain.

The embedded system may in some cases be incorporated into a wearable device, such as a patch, band, or an item of clothing. One particularly advantageous use of the embedded system is for interfacing with a biometric sensor in a wearable patch. The patch my have an adhesive backing for attachment to the skin. The biometric sensor (i.e. a skin or core body temperature sensor) can forward sensor data to the core digital domain. This may be processed by the chip logic and certain actions may be taken in response to a reading that is detected to be above or below a threshold. Information, including sensor data or warnings, can be sent to an external device via a radio transceiver on the chip. Because the device in this case has a crucial health function, and is required to be both lightweight/wearable and reliable, power saving is particularly important. The energy recycling and power saving capabilities of the embedded system described herein are therefore ideally suited to this type of use. The system is also particularly suitable for use with other simple sensing devices, such as heat or humidity sensors with a communicative function.

At least a portion, and in some cases all, of the power to the chip can be provided by renewable energy sources, where a renewable energy source refers to any energy source which is operable to harvest energy from an external environmental source or from the surroundings. The external environmental source from which energy is harvested by the renewable source can be solar energy (the sun), body heat, kinetic energy, radio, and so on. The renewable source itself can be any one or more of a photovoltaic (PV) cell, a radio frequency energy harvester (an RF source), a piezoelectric element, or a thermal energy harvesting element. Selection of a source may be based on available energy from each source, or based on pre-set conditions (i.e. if energy available from more than one source is above a threshold then alternate between the different sources for consecutive storage cadences or source energy from a preselected one of the available sources).

Figure 2:
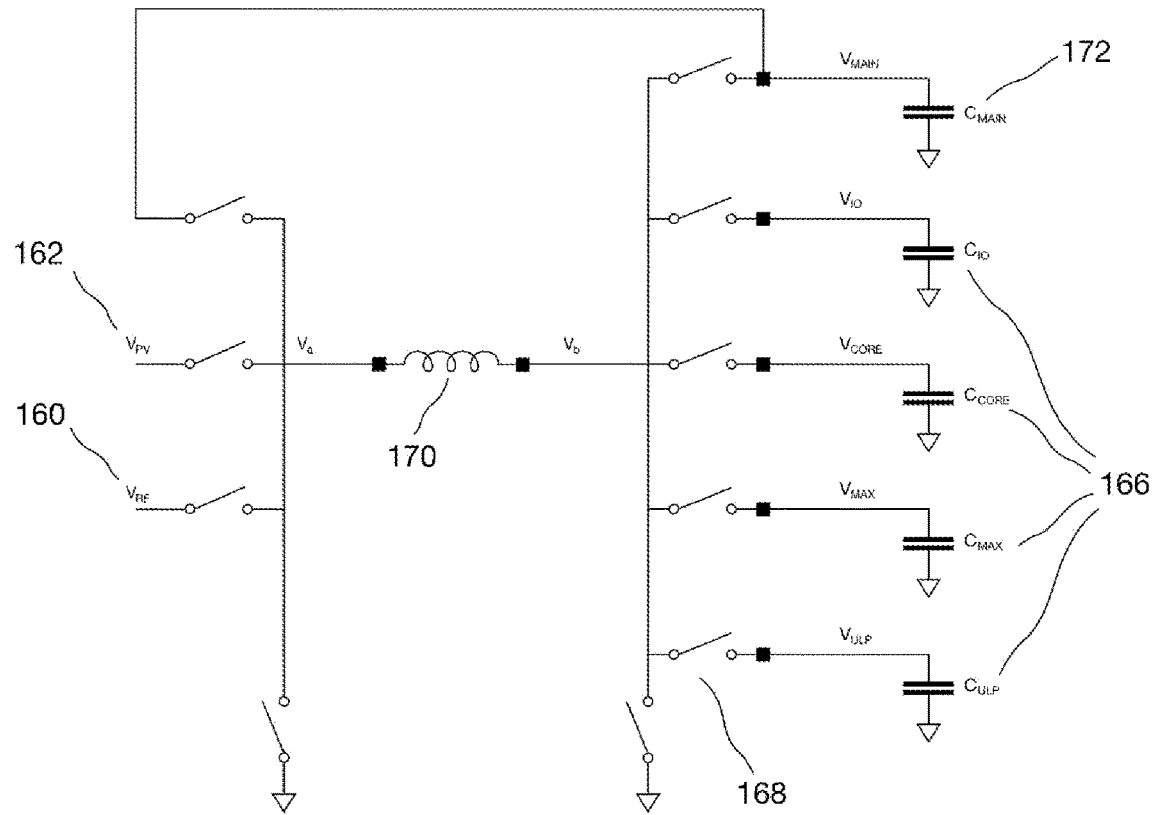
FIG. 2 is a diagram of the system including capacitors associated with the different power domains.

Any one or more renewable sources can be utilized, but a combination of at least one PV cell and at least one RF source provides a good coverage in terms of energy availability over a longer time period. These sources are illustrated in FIG. 2. The PV cell may be able to provide less input energy at night, for example, at which time the RF source can be more heavily utilised. Because the radio frequency harvester produces an alternating current, a rectifier, such as a wideband rectifier, may be included in the path between the RF source and the rest of the system. The rectifier is capable of converting any time varying signal, i.e. between 400 MHz and 2500 MHz in the case of an RF source, and converting it to a DC voltage. Such a rectifier may be included for any renewable source linked to the chip which has alternating current as an output. The PV cell is operable to take any weak input DC voltage and to store this for subsequent provision to requesting blocks, usually via an inductor as described below. The rectifier, if present, will then be between the source and the inductor.

Each of the power domains on the chip carries out a particular function or set of functions, and requires voltage to perform tasks associated with this function. The voltages required will depend on the specific tasks to be performed at any time, and will therefore vary based on demand. If some data needs to be sent, for example, the MRFD will require energy to prepare a packet for transmission and to send it. An application of the MRFD will send a request for a particular voltage to the PMU, which will respond by providing voltage at the requested level on one of a number of voltage rails, each associated with its own voltage/power domain on the chip. Once the correct voltage is available on a rail, the PMU will send a message to a controller of the MRFD indicating that the requested voltage is available, at which point the MRFD can draw the voltage through the rail, and execute the required logic to prepare and send the data packet. The voltage can continue to be supplied at the requested level by the PMU until the application associated with the MRFD indicates that it no longer requires energy (i.e. that the task is compete or that a task to be carried out periodically no longer needs to be carried out), at which point the PMU will adjust the power switches of the system to stop the supply of power on the respective voltage rail. The PMU can also stop providing energy to the domain in response to an indication from the domain storage unit that energy is no longer required. The indication may be in the form of the absence of a repeated request signal from the domain storage unit. When the request signal stops being sent, this indicates to the PMU that the domain storage unit is no longer required to be supplied with energy.

Figure 3:
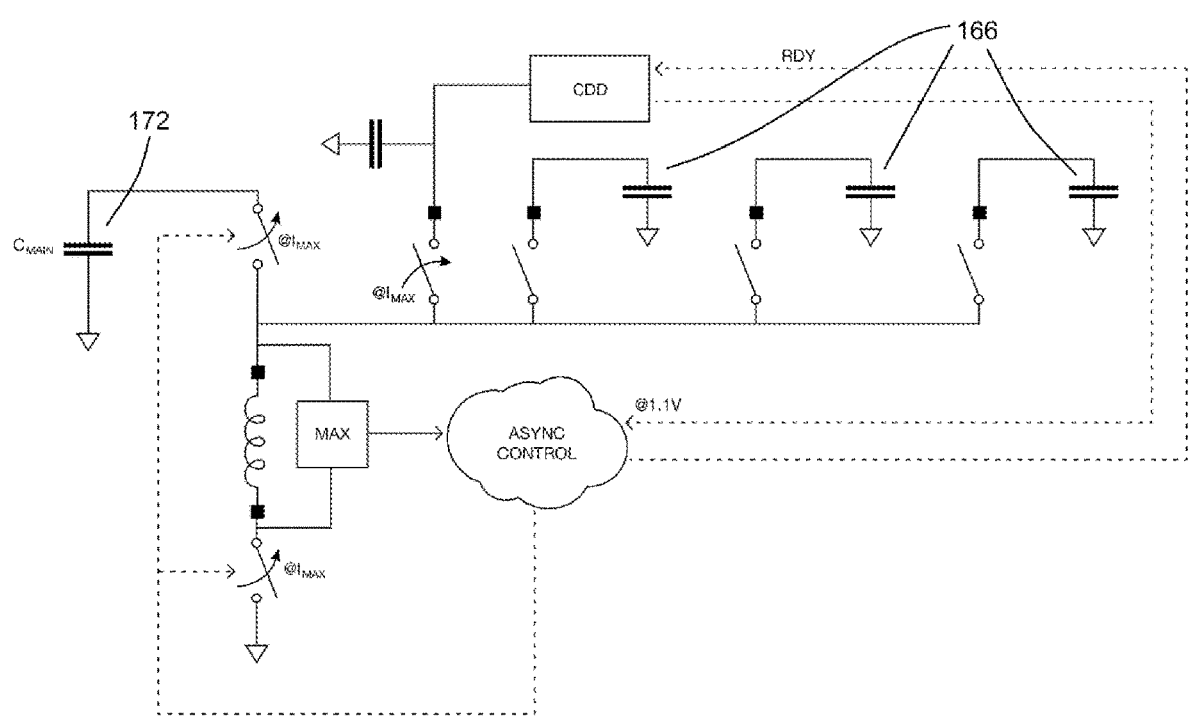
FIG. 3 illustrates the coupling between capacitors serving the power domains and the main capacitor.

Each of the voltage rails present can be associated with a decoupling capacitor, battery, or supercapacitor, as mentioned above, which each represent one of the domain storage units. Some of these domain storage units are shown in FIGS. 2 and 3 as capacitors 166 in one possible configuration of the system. These capacitors ensure that the requested voltage can be supplied, and can continue to be supplied, on each of the rails. Capacitor 172 is the main storage capacitor for the system, which represents the main storage unit, and the PMU controls charging of this main storage unit at a rate which is carefully adapted to the energy levels available from the sources providing input energy to the system. The different capacitors or storage elements representing the domain storage units can have different properties (i.e. different ratings), and can thus be tailored to provide a voltage at a particular level. In such a case, the PMU will select the correct capacitor to provide the desired voltage in response to a request from a system block, and will direct energy from the main storage unit to that capacitor to build up the energy stored thereon. Capacitors are used as the domain and main storage units here, but other energy storage mechanisms can be used in their place as mentioned. Further, although one storage element (i.e. one capacitor) is allocated as each of the main storage unit and the domain storage units in the example described, two or more energy storage elements can function together as a main storage unit or as a domain storage unit.

The embedded system includes an integrated PMU, which controls the supply of energy from the renewable sources linked to the embedded system to the various power domains via the main storage unit, as mentioned. The PMU can comprise charge/discharge control logic, which can be powered using one or more storage units that are separate from and present in addition to the main storage unit. The charge/discharge control logic storage units can be considered as a type of domain storage unit which supplies energy solely to the charge/discharge control logic and which, unlike the other domain storage units, can be charged directly from the power sources coupled to the system. Energy can in principle be recovered from this storage unit to the main storage, however it is expected that energy will be required from this unit regularly which may mean that it is not idle long enough for recovery to be useful. Alternatively, there can be no option for energy recovery from the charge/discharge control logic storage unit. Generally, though, the domain storage unit from which energy is transferred back to the main storage unit or to a domain storage unit is not chargeable directly from a power source coupled to the system, whereas the main storage unit is.

The charge/discharge control logic storage unit(s) are usually powered in preference to the other storage units within the system to ensure that charging of the main storage unit, operation of the electronics of the power domains, and recycling back to the main storage units from the domain storage units can always be executed, and energy can always be harvested by the system and supplied to the domains of the chip. The charge/discharge control logic storage unit may be one or more additional capacitors, and the system may be configured to ensure that these do not deplete. The charge on these capacitors may not be allowed to fall below a certain fixed level, for example. Including a separate storage unit to power the charge/discharge control unit which can be charged directly from a power source, rather than only from the main storage unit as for the rest of the chip logic, means that the main storage unit can be completely discharged to the power domains of the system if this is desirable.

Prior art systems can include PMUs, but if they are included these are generally not integrated in the sense that they are separate from the other components of the chip. There is no two-way communication between the PMU and the power domain(s) or blocks of the chip. Instead, the PMU supplies power to components of the chip (via the domain storage capacitors) through switches, which are turned on when power is required to run a task, and switched off when no power is required. The CPU therefore decides whether to accept power supplied through the PMU, but there is no further control of the supply in response to information sent from the blocks on the chip, and there is no further control and feedback relating to energy transfer to the different domain storage units and the charge/discharge control storage unit (if separate), and from or back to the main storage unit. This communication or interoperation between the PMU and the other components of the chip is important in terms of achieving optimum energy efficiency.

When the system is initially switched on, the first priority will be to provide energy to the capacitor dedicated to (allocated specifically to provide energy only to) the charge/discharge control logic storage unit. This will be carried out first as a default, and will continue until a threshold level of energy on the charge/discharge control logic storage unit is reached. At this point, the CPU can be switched on, requests for energy will be sent from the CPU to the PMU, and the charge/discharge control logic will start to operate to prioritise tasks and to guide the execution of storage, recycling, and operating cadences. The PMU will receive requests through the CPU from applications on the chip, which will either request energy for a single task to be executed as soon as possible, an ongoing task to be continued until an indication is received from the CPU that this can be discontinued, or will request energy at particular times for tasks which need to be carried out periodically (such as the sending of data every 30 minutes, as an example). The charge/discharge control logic will attempt to meet these requests by providing energy to the correct domain storage units at the correct times, but will monitor the state of charge on the main storage unit at the same time to ensure that collection of energy from the power sources coupled to the system is prioritised.

Each of the power domains on the chip can serve logic blocks configured to execute specific operations. The system may operate on a priority basis, by sorting tasks according to priority, and providing energy preferentially to those tasks which are higher up in the ranking.

An overview of components controlling the supply of energy to the different power domains in one example circuit configuration is shown in FIG. 2. The system in this case draws power from two separate renewable energy sources of different types. Any number of sources can be coupled to the system, however, and these can be of the same or of a different type. A traditional battery can be included, for example, for use in conditions which are unfavourable for operation of the renewable sources. The main storage unit can be supplied by the external power sources, or can itself comprise a battery or a similar energy storage unit. Here, the sources comprise one or more photovoltaic cells (providing $V_{PV}$; 162) and one or more radio frequency energy harvesters (providing $V_{RF}$; 160). These renewable sources are coupled to the rest of the system via switches, as shown. An additional switch couples each of the sources to a main or master capacitor 172 ($C_{MAIN}$; the main storage unit) via a voltage rail $V_{MAIN}$. An inductor 170 is included in the circuit between the power sources and capacitor, and this is used for voltage boosting to the main capacitor 172. The same inductor 170 can also be used for voltage boosting to additional capacitors 166, which represent the domain storage units in this case, and can be used both for voltage boosting to the main capacitor from the domain storage units when energy is to be recovered and for voltage boosting to the main capacitor from the power source(s). The inductor 170 can also be used for voltage boosting from the main storage units to any of the domain storage units. Obviously, using a single inductor for all energy transfer processes between the storage units is economical, simple, and allows for a particularly efficient process. The inductor may in some cases be coupled to a peak current sensor for detecting when the inductor is at peak current. The additional capacitors are linked to separate voltage rails and are used to ensure that the correct voltage can be supplied on each of the rails when required. The voltage level to which the capacitors in the circuit are charged can be controlled by power switches 168 associated with each capacitor. Once a particular charge level on the capacitor is reached, for example, the switch is opened to prevent further charging. Control of the switches is by the PMU, as will be described further below.

The system shown in FIG. 2 includes a domain storage unit or capacitor ($C_{MAX}$) which prevents leakage from the switches of the system. It is important that enough energy be present to effectively turn switches on and off. This is true, for example, for the switches coupling the inductor to the domain storage units or to the main storage unit for charging. Charging of the capacitor providing energy for switching is therefore generally prioritised by the charge/discharge control logic. Other domain storage units shown in FIG. 2 include $C_{CORE}$, which provides energy to the CPU and the peripheral interface(s) and $C_{IO}$ which is operable to set input and output voltages for the circuit. These domain storage units are generally configured to be charged up only from the main storage unit. $C_{ULP}$ is the dedicated storage unit for the charge/discharge control logic, can be considered as a type of domain storage, and can (in some cases) be chargeable from the main storage unit. $C_{ULP}$, however, in contrast to the other domain storage units, can also be charged directly from the power source, and this is done when the circuit is initially switched on in order to get the charge/discharge control unit operational. Obviously, the type, number, and configuration of the domain storage units can vary depending on the particular requirements of the system, but there will always be at least one power domain serviced by a domain storage unit to which energy is transferred from a main storage unit. The main storage unit may represent the only power source for the chip or may itself be provided with power from an external source, such as a renewable source.

The system can operate in at least three modes, a charging mode, an operating mode, and a recycling mode. During the charging mode, energy from one or more of the power sources is stored on the main storage unit. During the operating mode energy from the main capacitor is used to charge the domain storage units serving the power domains on the chip, and during the recycling mode energy is transferred under the control of the PMU from one or more of the domain storage units back to the main capacitor or to another of the domain storage units. Depending on the configuration of the system (i.e., the number of inductors and the positions of the switches), the system may be able to operate in two or more of these modes at one time. Typically, the system is more efficient if the modes are exclusive so that the system operates in one of the three modes at each time. The selection of which mode to operate in for each cadence can then be based on pre-set parameters at least initially, and/or can be adaptable depending on various factors. Generally, the recycling cadence will be allocated a lower priority and will be selected if the main storage element is sufficiently charged up and there are no vital tasks which need to be executed in an operating cadence.

As mentioned above, previous chip designs do not provide for a recycling mode at all, and energy sent to the domain storage units during the operating mode, and which is not used by the energy consuming components of the domain, is simply wasted. In the present system, the inclusion of a PMU which is configured to initiate and control recovery of any excess energy on the domain storage units replaces bleed out of this excess energy through a resistor. There is a certain level of energy which is generally required to be accumulated on each domain storage unit when the power domain is switched on in order to reach a level where the storage unit is capable of supplying the required voltage to the power domain. Where energy recycling is employed, this energy is not therefore simply wasted, but can be reused or redirected to a different power domain if desired. This greatly increases the energy efficiency of the circuit. The recycling of excess energy on the domain storage units after switch-off of the domain can be achieved in multiple ways, but the way in which it is carried out in the context of a specific system described herein is set out below.

A system such as that described herein and shown in the figures, including inductor 170 and the peak current sensor mechanism for detecting peak current, can be used under the control of the PMU to recycle internal energy of the circuit from the domain storage units back to the main storage unit or to another of the domain storage units of the system. When this is happening, the system is operating in its recycling mode and the cadence being executed is referred to as a recycling cadence. The recycling mode can be operated, similarly to the storage mode and the operating mode, by controlling the power switches of the system. During a recycling cadence the power switches are controlled to energize the inductor using energy from one or more of the domain storage units, with subsequent discharge of the inductor being to the main storage unit or to another of the domain storage units.

Figure 6:
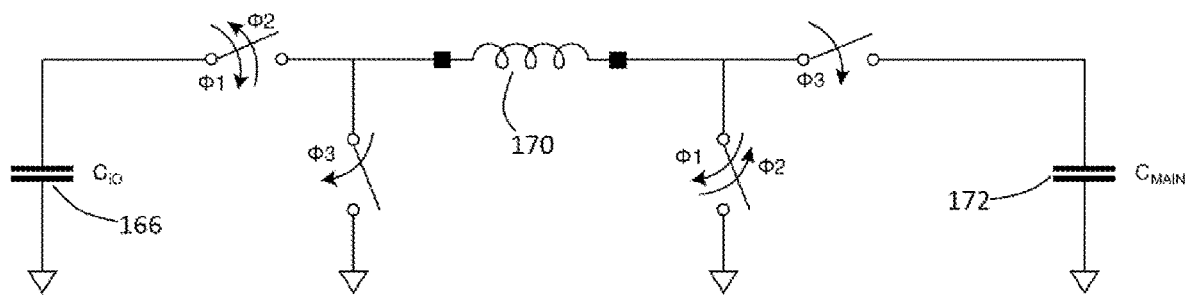
FIG. 6 illustrates the switching process for transferring energy from a domain storage unit back to the main storage unit.

This transfer of energy from the domain storage unit (energy recycling) is illustrated in FIG. 6, which shows the components of the system coupling the main capacitor $C_{MAIN}$ to a domain capacitor $C_{IO}$ through the inductor. The capacitor $C_{IO}$ is selected as an example, but obviously a similar process can be followed to transfer energy from any of the other domain storage units in the system. While capacitors are shown as the storage units here, these can also be replaced with another type of energy storage unit, as mentioned above. At the start of each cadence in the recycling mode (referred to as a "recycling cadence"), the PMU causes the inductor to be energized by controlling the power switches of the system to run a current from one of the domain capacitors where excess energy is present, through the inductor to ground. This is represented as $\phi1$ (phase 1) in the figure (switches from domain storage unit to inductor, and from inductor to ground closed). $\phi2$ of the transfer process comprises opening of the switch coupling the domain storage unit to the inductor and the switch from the inductor to ground, and $\phi3$ comprises closing of the switches coupling the inductor to the main storage unit, and the switch coupling ground to the inductor on an opposite side. The closing of the switches in phase 3 allows current to flow from the inductor to the main storage unit to store energy there. The phases indicated in the figure are carried out in turn ($\phi1$, directly followed by $\phi2$, directly followed by $\phi3$) under control of the PMU. The switches in this case represent the power switches of the system, and there may be additional switches associated with additional power domains.

The inductor 170 can be associated with a peak current sensor package made up of at least one peak current sensor, in communication with the PMU, which measures the current across the inductor as this increases (or which measures an equivalent quantity). This measurement of the current will preferably be a continuous measurement but can also be periodic with a fairly short period (i.e. a frequency in the KHz range, up to around 1 MHz). This frequency can be adaptable based on the availability of external energy or other parameters, or can be fixed. The frequency may be adaptable for a storage cadence and predetermined/fixed for a recycling and operating cadence. When a maximum or threshold level, referred to as "peak current" is detected on the inductor by the associated peak current sensor package, the state of the switches is again changed to discharge the current from the inductor to the main storage capacitor $C_{MAIN}$ or to another of the domain storage units. This state of the circuit is maintained until zero current is again detected on the inductor, by the same or a different sensor within the peak current sensor package, at which point the system switches to idle mode (in the example shown in FIG. 5 this means that switches A and B are closed, and switches MAIN and IO are open). The sensors can monitor any parameter, i.e. voltage or current, provided that they are able to detect when peak current and zero current are reached.

The full cycle, from the time at which the cadence begins and the inductor begins to be charged up using energy stored on the domain capacitor(s) to the point at which zero current is detected on the inductor (start energizing inductor using the domain storage capacitor—monitor current across inductor—detect "peak current" reached—operate switches to transfer energy on the inductor to the main storage capacitor or another domain storage capacitor—detect "zero current" reached) can be referred to as a cadence or in this case an "recycling cadence". The recycling cadence, as for the storage and operating cadences described below, may end when the current across the inductor reaches zero.

The above is one method by which energy can be recycled from one or more of the domain storage units back to the main storage units or to another domain storage unit. This could also be achieved using a traditional clocked inductor with the clock frequency set appropriately. A first inductor (either with a peak current detector allowing for a variable cadence length or a traditional clocked inductor) can be provided for transfer of energy from the domain storage units to the main storage unit or to another of the domain storage unit. A second, separate inductor can be used to transfer energy from the main storage unit to the domain storage, and energy from any power sources can be transferred to the main storage unit through a third inductor (again either a traditional clocked inductor or an inductor with a peak current detector). A separate inductor can be provided for transfer of energy from each of the individual domain storage units to the main storage unit, or energy can be transferred without using an inductor. In some cases, such as where more than one inductor is present and associated with different domain storage units, energy can be transferred simultaneously from two or more of the domain storage units back to the main storage unit or to an additional domain storage unit.

Although a plurality of separate inductors is a possibility, it is more efficient to include only one inductor in the system, to execute only one type of cadence at one time, and to use the same inductor for any energy transfer that takes place between the power sources and storage units of the system.

The PMU is operable to determine whether or not energy is present on one or more of the domain storage units, and whether or not this excess energy is available to be transferred. The domain storage units therefore each include an energy sensor coupled to the PMU which indicates either whether the energy stored on that unit is above or below a threshold level, indicates whether there is any energy at all on the domain storage unit, or in some cases provides a quantitative measure of the level of energy on each of the domain storage unit. If the mechanism by which energy is transferred within the system is as described above, and excess energy is detected on a domain which is not in use, then the PMU will determine that a recycling cadence should be carried out. This determination may also depend on other requirements of the chip, which may have a higher priority. A storage cadence or an operating cadence may in some cases be carried out even when excess energy is available on the domain storage units to be transferred, for example, if a particularly high level of energy is available from the source or a vital operation needs to be carried out within a certain timeframe.

The recycling cadence can be initiated by any of the PMU determining that a recycling cadence is required (i.e. due to allocating priority to another power domain to which energy needs to be transferred urgently), the application of the power domain (informing the PMU that the task for which energy is being supplied has been completed), or the domain storage unit itself (termination of a repeated "keep alive" signal informs the PMU that energy is no longer required).

Of course, there may be a number of domain storage units from which energy is not being drawn to service the chip, or which are judged to be of lower priority, and on which energy above the threshold level is stored. A recycling cadence can therefore comprise transfer of energy to the inductor from more than one of the domain storage units present on the chip. The transfer of energy from the plurality of domain storage units to the inductor can be carried out separately and in turn or simultaneously. If transfer is carried out from the two or more domain storage units in turn, then when a recycling cadence starts the inductor is connected up to transfer energy from a first domain storage unit, having excess energy thereon, to the inductor. Once energy stored on the first domain storage unit is detected to be depleted to zero or to below a threshold level, the inductor is connected up to a second domain storage unit having excess energy thereon to transfer energy from that storage unit to the inductor. This process can continue until peak current on the inductor is reached, or until no further excess energy is available on any of the domain storage units with excess energy thereon. This same process can be carried out using one or more traditional clocked inductors, with accumulation of energy on the accumulator continuing for a clock cycle.

In some cases, recycling of energy from a particular domain storage unit to the main storage unit may be carried out each time that particular domain becomes idle in the event that there is energy remaining on the domain storage unit. When the required operations are complete, and energy is no longer required by the domain served by the storage unit, the PMU can initiate transfer of any remaining energy on the domain storage unit back to the main storage unit.

Figure 4:
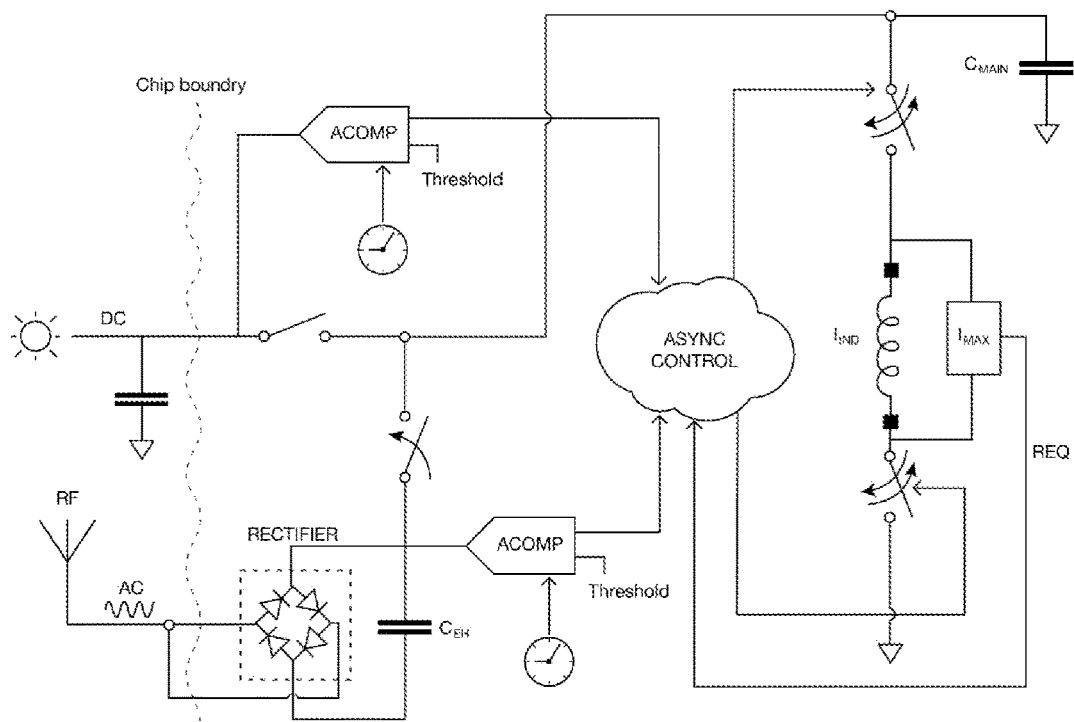
FIG. 4 shows the interaction between AC comparators and energy sources in an embedded system.

Storage and operating cadences can be carried out in a similar manner to the recycling cadence described above. As shown in FIG. 4, each of the sources of the circuit can be associated with an analogue comparator (ACOMP) which compares the energy available from the source to a threshold energy level. If the threshold energy level is met or exceeded, asynchronous logic associated with the PMU is triggered, and the process of charging the main storage capacitor 172 begins. The threshold may be pre-determined, or may be adaptable either manually to configure the chip or by the PMU in some cases. If more than the threshold level of energy is available from more than one source, the selection of a source for transfer of energy to the inductor during the next storage cadence may be based on pre-set parameters. Sources may be ordered according to priority, for example, or the system may alternate between the two or more available sources for consecutive storage cadences.

One novel feature of the system which helps to make the high level of energy efficiency possible is that, rather than continuously comparing at a particular frequency, the frequency with which these comparators perform the checking step is variable. This opens up the option of providing feedback to adapt the time period between comparisons. Each of the comparators is coupled to an oscillator, usually an oscillator requiring an extremely low energy to run such as a nanowatt oscillator, which is under the control of the PMU. The frequency of the oscillator signal can be adjusted based on the level of energy input from the associated source. Where the input energy levels are low, and are less likely to meet the threshold requirement at the next comparison, the frequency of the oscillator signal can be decreased, so that the comparator is operated less often to perform the threshold comparison, and energy usage is reduced.

When the comparator detects that the voltage from its associated source has reached the threshold level, asynchronous logic in the PMU, which is the charge/discharge control logic, is triggered. If the chip is to operate in storage mode, then the input voltage from the source (or another source which can provide energy above a threshold level) is connected up to the inductor 170 by configuring switches in the circuit to run current from the source, through the inductor, to ground. This is under the control of the charge/discharge control logic of the PMU. As mentioned above, the inductor can be associated with a peak current sensor package made up of at least one peak current sensor, in communication with the PMU, which measures the current across the inductor as this increases (or which measures an equivalent quantity). This measurement of the current will preferably be a continuous measurement but can also be periodic with a fairly short period (i.e. a frequency in the KHz range, up to around 1 MHz). This frequency/period can be adaptable based on the availability of external energy. When a maximum or threshold level, referred to as "peak current" is detected on the inductor by the associated peak current sensor package, the state of the switches is again changed to discharge the current from the inductor to the main storage unit $C_{MAIN}$. The same or a different sensor within the peak current sensor package and associated with the inductor detects when zero current is again reached (inductor fully de-energized). Once zero current is reached the system can remain in an idle state (switches for coupling the inductor to ground closed, switches for coupling the inductor to the sources and main storage capacitor open) awaiting operation of the PMU to start the next cycle. If the next cycle is a storage cadence, this will begin by again adjusting the configuration of the switches to run a current through the inductor from the source to begin to re-energize it.

The full cycle described above from the time when the PMU initiates accumulation of energy on the inductor after a threshold level of energy is detected at the source to zero current being reached on the inductor (detect threshold current—start energizing inductor—monitor current across inductor—detect "peak current" reached—operate switches to de-energize the inductor to the main storage unit—detect "zero current" reached) can be referred to as a cadence or in this case a "storage cadence". The storage cadence may end when the current across the inductor reaches zero. The energy on the inductor will then have been transferred to the main storage unit, which may have a capacity large enough to store energy from a plurality of storage cadences without depletion. After a storage cadence, therefore, the charge on the main storage unit will have increased.

Connection of the inductor between the source and ground to energize the inductor may be dependent on the comparator connected with that source again detecting that the threshold level has been met or exceeded. The start of each storage cadence (and therefore the time period between de-energizing of the inductor and the subsequent connection between the source and ground) may therefore depend on when the comparator next checks the voltage level from the source. The length of the cadence will also depend on the speed at which the inductor can be energized, which will itself depend on the energy input by the source. The cadence is therefore self-adjustable based on feedback received by the PMU, which is a huge advantage compared to prior art systems using a traditional oscillator signal at a particular frequency to start the discharge process for the inductor. Traditional circuits of this type are very efficient in a situation where the time to charge the inductor is similar to the time period of the oscillator signal, and display a peak in the efficiency curve at the specific level of input energy required to achieve this, however at other energy input levels they become much less efficient. This is because the inductor reaches peak current either too soon, in which case energy is wasted, or does not reach peak current before transfer of energy away from the inductor begins, in which case charging of the capacitor in the system is not optimised.

The oscillator coupled to the or each of the comparators can be adapted by an instruction from the PMU to increase the frequency of the oscillator signal if the threshold level is being consistently met (i.e. energy levels from the source are high) and to decrease the frequency if the threshold is not being consistently met. The frequency may be increased by a fixed amount, for example, if for the last three periods the threshold energy level was met. The number of periods checked may be between 1 and 20, preferably between 2 and 10, and most preferably 3 to 5. The frequency may be decreased if, for each of the checked duty cycles, the threshold energy level was not met. Because the frequency of the oscillator coupled to each comparator is configured to vary based on how often the threshold is being met, the start of the cadence will not be delayed in a case where ample energy is available.

This will tend to reduce the time period between the start of each cadence in a situation where a high level of energy is available from the source.

Although usually a simple comparator will be used, which is only able to determine whether the energy level has or has not reached a threshold, in some cases an actual energy level may be determined such as by using an analogue-digital convertor in place of the comparator. Alternatively, two or more separate comparators, each detecting when an energy level at the source exceeds a different threshold, can be included. In the latter two examples, the frequency of the oscillator signal controlling the comparators and/or A-D convertors can be increased when the threshold is approached if desired. This can be based on an additional threshold, for example, which is lower than the energy threshold for activation of the asynchronous logic. When this additional threshold is reached, the frequency of the oscillator signal can be increased, and thus the period between comparisons carried out by the comparator is shortened to trigger the logic as close as possible to the time at which the threshold energy becomes available.

For this type of cadence, the PMU may also, before configuring the switches to charge up the inductor and after selecting a storage cadence as the next cadence, select one of the two or more energy sources with which to charge the main capacitor. This decision may be based on which of the sources triggered the logic (i.e. which is detected to be able to supply at least the threshold voltage level). If the energy level at both sources is above the threshold, then the decision may be based on alternative factors, such as which source is likely to be able to keep supplying energy for the longest, or which source is able to provide the highest voltage level. Sources may also be alternated or ordered according to priority as described above. If a priority list is used, this can be worked down to find the highest listed source with energy available above the threshold. Generally, the threshold energy level will be the same for each source, but it may be different.

Figure 5:
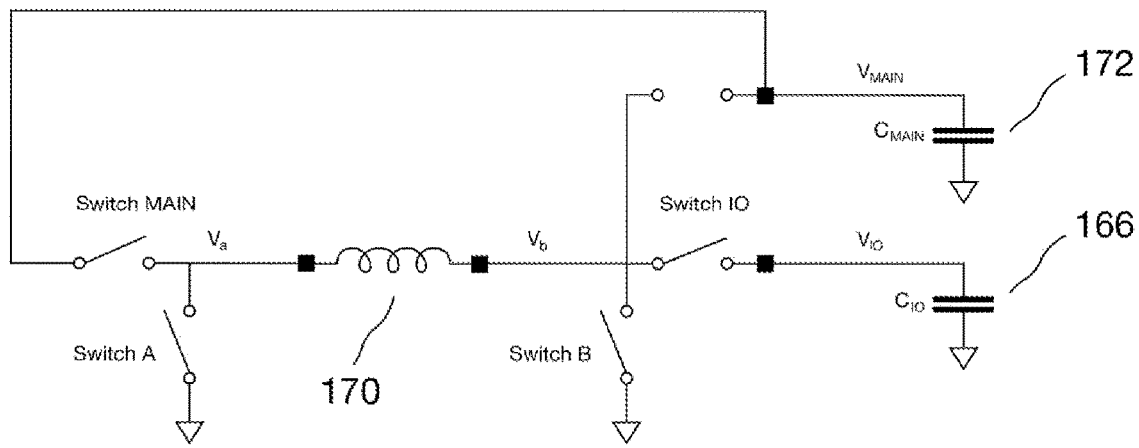
FIG. 5 illustrates components of the system used for recycling energy from a domain storage capacitor $C_{IO}$ back to the main storage element.

The operating mode works very similarly to the storage mode and recycling mode but, rather than energizing the inductor using energy from the source or the domain storage unit, the inductor is energized from the main capacitor and discharged to the circuit (which may be to one or more of the domain storage units used to provide a voltage to the power domains). This is illustrated in FIG. 5, which shows the components of the system coupling the main capacitor $C_{MAIN}$ to a domain capacitor $C_{IO}$ through the inductor. The capacitor $C_{IO}$ is selected as an example, but obviously a similar process can be followed to transfer energy to the other domain storage capacitors in the system. At the start of each cadence in the operating mode (referred to as an "operating cadence"), the PMU again causes the inductor to be energized, this time by controlling the power switches in the system to run a current from the main capacitor through the inductor to ground. This is achieved in the example shown in FIG. 5 by closing switch B to ground and switch MAIN to the main capacitor, while switches A and IO are open. When peak current is detected on the inductor, the state of the switches is again changed (in this case switches B and MAIN are opened and switches IO and A are closed), to discharge the current from the inductor to the domain capacitor $C_{IO}$. This state of the system is maintained until zero current is again detected on the inductor, at which point the system switches to idle mode (switches A and B closed, switches MAIN and IO open).

The full cycle, from the time at which the cadence begins and the inductor begins to be charged up using energy stored on the main capacitor to the point at which zero current is detected on the inductor (start energizing inductor using the main storage capacitor—monitor current across inductor— detect "peak current" reached—operate switches to transfer energy on the inductor to the domain storage capacitor—detect "zero current" reached) can be referred to as a cadence or in this case an "operating cadence". The operating cadence, as for the storage and recycling cadences described above, may end when the current across the inductor reaches zero. Initiation of the cadence may depend a threshold energy level being reached on the main capacitor in order for the asynchronous logic to be triggered.

Once the charge/discharge control logic has been triggered, the PMU may make a determination as to whether the next cadence will be a storage cadence, an operating cadence, or a recycling cadence. This may depend on the availability of energy from the source, requirements for voltage from the blocks of the chip, and the level of energy on each of the domain storage units present for idle power domains of the chip. If no requests for a voltage have been sent by any of the blocks (the CDD for example), then a storage cadence may be executed next. If there is a pending request for a voltage, however, and this cannot be met by energy already stored on the domain storage capacitors, then an operating cadence may be executed next. A recycling cadence may be executed if excess energy is detected on domain storage capacitors which are not currently providing energy to their associated domains. Which type of cadence to execute next may also depend on pre-set preferences, which may adapt in response to external parameters, may be manually configurable, or may remain fixed. Every integral number of cadences, where the integral number is between 2 and 20, preferably between 3 and 10 (such as every $3^{rd}$, $4^{th}$, $5^{th}$, or $6^{th}$ cadence) may be an operating and/or every integral number of cadences, where the integral number is between 2 and 20, preferably between 3 and 10 (such as every $3^{rd}$, $4^{th}$ $5^{th}$ or $6^{th}$ cadence) may be a recycling cadence, for example, at least at the initial stages of operation. These preferences may be able to be overridden in some cases, such as in the event of an urgent request for more energy from a high priority application which needs to execute, or an extremely low level of energy detected on the main storage unit. The activity of the system may also be used to adapt the relative frequency of the operating, storage, and recycling cadences.

As shown in FIGS. 2 and 3, there are a number of additional capacitors operable to provide a voltage on different rails, and more than one of these may need to be charged during a single cadence to provide a requested voltage to one or more of the domains on the chip. In the example shown, four domain storage capacitors ($C_{IO}$, $C_{CORE}$, $C_{MAX}$, and $C_{ULP}$) are present on four voltage rails, however there may be many more voltage rails, each associated with an additional capacitor for decoupling in order to provide the correct voltage to the rail. During an operating cadence or several consecutive operating cadences, the switches to one of the additional capacitors is closed, under control of the PMU, so that energy is supplied to that capacitor. Once a capacitor has been charged up to the voltage level requested by one of the domains, the PMU informs that domain that the voltage requested is available on one of the voltage rails (and may control switches within the system to connect the power domain to that rail). The power domain then sources the required voltage and executes the task.

The system can continue recharging the domain storage unit to the desired level at least until the power domain informs the PMU that the requirement for a voltage no longer applies if the task is to be carried out repeatedly or continuously. If a task needs to be executed only once, one or more operating cadences may be executed to provide the required amount of energy just for that single execution of the task. Requests for energy to execute a task that needs to be carried out periodically may instead result in the scheduling of operating cadences at particular times. A request for energy once a day, or every hour, for example, will result in an operating cadence being scheduled to provide energy at the required level to the requesting power domain at the specified times.

In a case where no voltage has been requested (i.e. no tasks need to be completed) and the threshold energy level is not being met by either of the input sources, the system can execute a recycling cadence to transfer excess energy on the domain storage units back to the main storage unit, or to another domain storage unit, and then operate in its idle mode (switches A and B in FIG. 3 closed, other switches open, peak current sensor or sensors associated with the inductor not operating). Minimum energy is used in this mode. Once a request is again sent to the PMU, or the threshold energy level is again met, a new cadence will start.

The cadence, whether it is a storage, operating, or recycling cadence, continues until the inductor has reached peak current and has subsequently transferred energy away either to charge the main capacitor (storage or recycling cadence) or the domain storage capacitors (operating cadence). The time taken to energize the inductor to reach its peak current will depend on the input voltage from the source in the case of a storage cadence. The cadence will proceed more slowly, and will be longer, if the energy level provided from the one or more sources is low, and will proceed more quickly if the energy level from the one or more sources is high. The only upper limit on how fast the process can run is set by the inherent logic speed of the process itself, and in these ways the control loop differs from the traditional clocked logic. The fact that no clock source is required for this purpose means that the quiescent energy can be extremely low compared to a traditional approach.

As mentioned, in a case where only one inductor is associated with the system, at the start (or end) of each cadence, the PMU makes a decision as to whether, for this (or the next) cadence, the system will operate in the storage, recycling, or operating mode, and adjusts switches accordingly. If a number of requests for a particular voltage level have been received from the various power domains on the chip, the PMU may cause the next cadence to be carried out in operating mode in order to serve these requests. If a high level of input energy is detected from the sources, the PMU may cause the next cadence to be carried out in charging mode to store this energy on the main capacitor, and if excess energy is detected on domain storage units which are not in use a cadence in recycling mode may be carried out. The decision may be based on many factors, among them energy input levels from the sources over the time period just passed, expected input energy from the sources in a time period to come, type and number of requests from the power domains, default settings, and so on. In some cases, two or more separate inductors can be provided to carry out one or more of the following tasks: to boost energy from the source for storage on the main capacitor; to boost energy from the main capacitor for charging of the domain storage units; or to boost energy from the domain storage units/additional capacitors for charging of the main storage unit or another of the domain storage units. In such a case, these processes can proceed separately with their own cadences, and can proceed at different speeds.

Operations are run by routing voltage to the requesting domain and informing that domain that the requested voltage rail is available (at which point the relevant tasks will be executed) and storage of energy is carried out by controlling switches to discharge the inductor to a main capacitor. Unlike a typical circuit, however, the length of each cadence is self-adjusting and can vary from one cadence to the next.

The mechanism by which this is achieved is by way of feedback from a peak current sensor associated with the inductor forming part of the circuit, and/or from comparators associated with the renewable energy sources configured to provide power to the circuit. This provides a very fine level of control of the energy usage by the system and results in an extremely energy efficient device overall.

There may be two current sensors present to detect peak current through the inductor and zero current respectively. These may both be switched off in the idle state of the system (under control of the PMU), the peak current detector may be switched on whenever the inductor is charging, and the zero current detector may be switched on whenever the inductor is in the process of being de-energized and is transferring energy to the main storage unit or to the domain storage unit(s).

The decision as to whether to execute a charging cadence, a recycling cadence, or an operating cadence taken by the PMU may be based on pre-configured parameters, or may be adjustable or self-adjusting. In one example, one in every whole number of cadences is an operating cadence, and/or every whole number of cadences is a recycling cadence, with other cadences being storage cadences. If the whole number is the same for both the operating and recycling cadences, and the whole number is more than three, then priority is given to charging the main storage unit. The frequency of operating cadences may be increased at certain times of day, if less energy is available from the sources, or if an application of one of the power domains on the chip requests energy urgently. If energy available from the source is low, recycling cadences can be executed to replace energy depleted from the main storage where possible.

The threshold energy level required to be met before a storage cadence begins will usually depend on the source type, but can also be configurable, or variable based on external factors, such as the time of day, previous operation of the system, and so on.

The invention claimed is:

1. An embedded system comprising:
    at least one power domain comprising at least one of, analogue and digital circuitry;
    at least one domain storage unit for decoupling the power domain from a main storage unit and for providing energy to the power domain;
    the main storage unit storing energy for provision to the at least one domain storage unit;
    power switches for controlling the flow of energy between storage units of the circuit;
    a power management unit operable to control the power switches to transfer energy from the at least one domain storage unit back to the main storage unit or to an additional domain storage unit of the system; and
    an energy sensor for indicating whether the energy stored in the domain storage unit is at least one of, (1) above a threshold level and (2) providing a measure of the level of energy stored in the domain storage unit.

2. The embedded system according to claim 1, wherein the power management unit is configured to control the power switches to transfer energy from the domain storage unit only when the level of energy is at or above a threshold.

3. The embedded system according to claim 2, wherein the threshold is 0 Joules.

4. The embedded system according to claim 3, wherein the power management unit is configured to control the power switches to transfer energy from the at least one domain storage unit in response to a request for energy by one or more additional power domains having higher priority.

5. The embedded system according to claim 2, wherein the power management unit is configured to control the power switches to transfer energy from the at least one domain storage unit in response to a request for energy by one or more additional power domains having higher priority.

6. The embedded system according to claim 2, wherein the power management unit is configured to control the power switches to transfer energy from the at least one domain storage unit in response to an indication from an application of the power domain that energy is no longer required.

7. The embedded system according claim 1, wherein the power management unit is configured to control the power switches to transfer energy from the at least one domain storage unit in response to a request for energy by one or more additional power domains having higher priority.

8. The embedded system according to claim 1, wherein the power management unit is configured to control the power switches to transfer energy from the at least one domain storage unit in response to an indication from an application of the power domain that energy is no longer required.

9. The embedded system according to claim 1, wherein the domain storage unit is configured to repeatedly send a signal to the power management unit to indicate that the power domain needs to stay powered, and the power management unit is configured to control the power switches to transfer energy from the at least one domain storage unit when the signal is not received for an amount of time.

10. The embedded system according to claim 9, wherein the amount of time is configurable.

11. The embedded system according to claim 1, comprising an inductor wherein controlling the power switches of the system to transfer energy from the domain storage unit comprises controlling the power switches to accumulate energy from the at least one domain storage unit in the inductor and then to transfer the accumulated energy from the inductor to one of, the main storage unit or the additional domain storage unit.

12. The embedded system according to claim 11, wherein the power management unit is also configured to control the power switches to accumulate energy from the main storage unit in the inductor and then to transfer the accumulated energy from the inductor to the at least one domain storage unit.

13. The embedded system according to claim 11, comprising a peak current sensor circuit for monitoring a current through the inductor as the energy is accumulated therein, wherein the power management unit is configured to control the power switches to connect the inductor for transfer of the accumulated energy away from the inductor in response to a signal from the peak current sensor circuit that peak current has been reached.

14. The embedded system according to claim 1, wherein the at least one domain storage unit is a capacitor.

15. The embedded system according to claim 1, wherein the power management unit is configured to control the power switches to continue the transfer of energy from the domain storage unit until the domain storage unit is fully depleted.

16. The embedded system according to claim 1, wherein the embedded system is a monolithic system on chip comprising a plurality of blocks including: the power management unit and a core logic unit comprising the analogue and digital circuitry, and having a memory.

17. The embedded system according to claim 1, wherein the main storage unit is configured to store energy from at least one power source, and the power management unit is configured to interface with the at least one power source to control transfer of energy therefrom to the main storage unit.

18. The embedded system according to claim 17, wherein the at least one power source is a renewable power source.

19. A device comprising the embedded system of claim 17, the at least one power source, and an environment sensor coupled to the system for monitoring a property of surroundings.

20. The embedded system according to claim 1, wherein the power management unit is configured to control the power switches to transfer energy from the at least one domain storage unit to another domain storage unit associated with a different power domain of the system.

21. A method for operating an embedded system comprising:
    at least one power domain comprising at least one of, analogue and digital circuitry;
    at least one domain storage unit for decoupling the power domain from a main storage unit and for providing energy to the power domain;
    wherein the main storage unit is operable to store energy from a power source during a storage cadence for provision to the at least one domain storage unit during an operating cadence; and
    power switches for controlling the flow of energy between the storage units of the circuit, wherein the method comprises:
    controlling, by a power management unit of the system, the power switches to transfer energy from the at least one domain storage unit back to one of, the main storage unit or to an additional domain storage unit of the system during a recycling cadence.

\* \* \* \* \*